(12) United States Patent
Vasudevan (10) Patent No.: US 10,564,728 B1
(45) Date of Patent: Feb. 18, 2020

(54) GRAVITY-INDUCED POSITION OFFSET TRACKING FOR DYNAMIC MANAGEMENT OF HAPTIC MODULE MECHANICAL OFFSET

(71) Applicant: Apple Inc., Cupertino, CA (US)

(72) Inventor: Hari Vasudevan, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/127,139

(22) Filed: Sep. 10, 2018

(51) Int. Cl.
*G06F 3/01* (2006.01)
*G01C 9/06* (2006.01)
*G06F 3/041* (2006.01)

(52) U.S. Cl.
CPC ............. *G06F 3/016* (2013.01); *G01C 9/06* (2013.01); *G06F 3/041* (2013.01)

(58) Field of Classification Search
CPC ........ G06F 3/016; H02K 29/08; H02K 29/12; H02K 33/18; H02P 23/12; H02P 23/14; H02P 25/034; H02P 29/60
See application file for complete search history.

(56) References Cited

U.S. PATENT DOCUMENTS 9,746,923 B2 * 8/2017 Cruz-Hernandez ..... G06F 3/016
10,110,152 B1 * 10/2018 Hajati ................... H02P 25/032

* cited by examiner

*Primary Examiner* — Stacy Khoo
(74) *Attorney, Agent, or Firm* — Fish & Richardson P.C.

(57) ABSTRACT

Disclosed is a system, method and apparatus for dynamic management of haptic module mechanical offset with gravity-induced position offset tracking. In an embodiment, a method comprises: determining, by a processor, a gravity-induced position offset of a mass in a haptic module; generating, by the processor, a position command for moving the mass from a sensor reference position to a mechanical resting position based at least in part on the gravity-induced position offset; and moving, by a closed-loop controller, the mass from the sensor reference position to the mechanical resting position in accordance with the position command.

12 Claims, 5 Drawing Sheets

GRAVITY-INDUCED POSITION OFFSET TRACKING FOR DYNAMIC MANAGEMENT OF HAPTIC MODULE MECHANICAL OFFSET

TECHNICAL FIELD

This disclosure relates generally to controlling linear resonant actuators.

BACKGROUND

Some mobile devices (e.g., smart phones) include a haptic module that is configured to provide a tactile sensation such as a vibration to a user touching or holding the mobile device. The haptic module is a linear resonant actuator (LRA) that is connected mechanically to an input surface of the mobile device. Drive electronics coupled to the LRA cause the LRA to induce vibration which is transferred to the input surface so that the vibration can be felt by a user who is touching or holding the mobile device.

Some haptic module designs include a closed-loop controller that is configured to move a mass of the haptic module from its mechanical resting position to a sensor reference position (e.g., a sensor zero reference position) before processing a haptic waveform, and after processing the haptic waveform, move the mass back to its mechanical resting position to conserve power. The closed-loop controller ensures that the mass moves smoothly to its mechanical resting position to avoid a perceived "click" that occurs when the mass is moved too quickly. When the haptic module is embedded in a wearable device (e.g., a smart watch), holding the mass at the sensor reference position during orientation of the wearable device causes an undesirable transient or haptic "click" during controller turn off.

SUMMARY

Disclosed is a system, method and apparatus for dynamic management of haptic module mechanical offset with gravity-induced position offset tracking.

In an embodiment, a method comprises: determining, by a processor, a gravity-induced position offset of a mass in a haptic module; generating, by the processor, a position command for moving the mass from a sensor reference position to a mechanical resting position based at least in part on the gravity-induced position offset; and moving, by a closed-loop controller, the mass from the sensor reference position to the mechanical resting position in accordance with the position command.

In an embodiment, a linear resonant actuator (LRA) comprises: a housing; a mass disposed in the housing and configured to oscillate in response to a haptic waveform; a motion sensor configured to sense an acceleration of the mass due to gravity; a processor configured to: determine a gravity-induced position offset of the mass based on the gravitational acceleration and an angular frequency of the mass due to the oscillating; and determine a position command using the gravity-induced position offset; and a closed-loop controller configured to: move the mass from a sensor reference position in the housing to a mechanical resting position in the housing in accordance with the position command.

In an embodiment, an electronic device comprises: an input surface; a haptic module mechanically coupled to the input surface and including a mass that moves in response to a haptic waveform; one or more processors configured to: determine a gravity-induced position offset of the mass in the haptic module; and generate a position command module using the gravity-induced position offset, the position command for moving the mass from a sensor reference position in the haptic module to a mechanical resting position in the haptic module; and a closed-loop controller configured to: move the mass from the sensor reference position to the mechanical resting position in accordance with the position command; and oscillate the mass in accordance with the haptic waveform.

Particular embodiments disclosed herein provide one or more of the following advantages. Gravity-induced position offset resulting from an orientation change of a haptic module is tracked and used by a closed-loop controller to smoothly move its mass to a mechanical resting position in a controlled manner to avoid an undesirable haptic transient (e.g., a perceivable "click"). Embodiments are disclosed for tracking gravity-induced position offset using a closed-loop controller and using sensor-based compensation.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Overview

Figure 1:
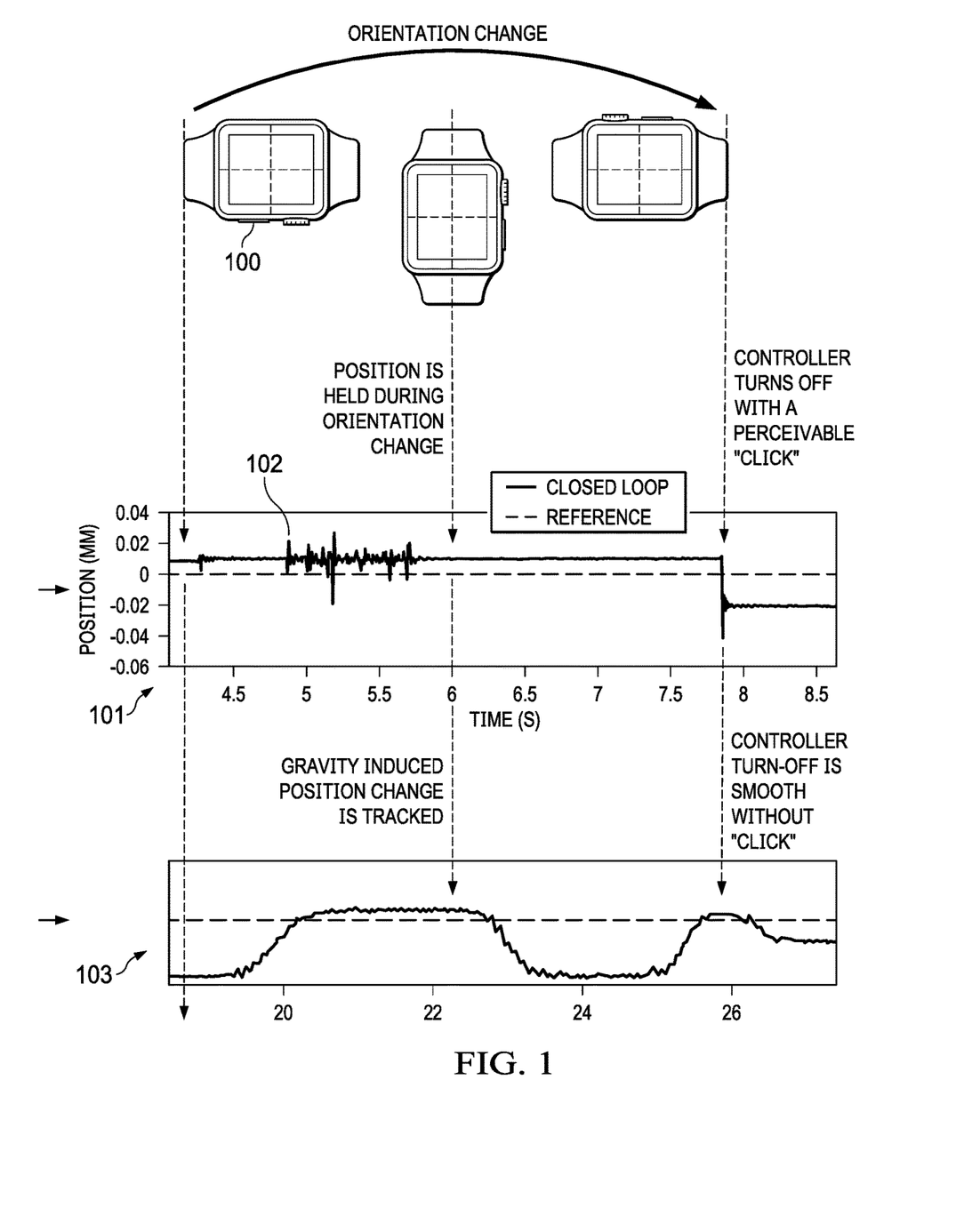
FIG. 1 illustrates gravity-induced position offset tracking, according to an embodiment.

FIG. 1 illustrates gravity induced position tracking, according to an embodiment. In this example use scenario, mobile device 100 (e.g., a smart watch) is rotated 90° clockwise and then 90° counter-clockwise over a period of time. As shown in plot 101, the position (in millimeters) of the mass is held at its sensor reference position (~0.01 mm) by a closed-loop controller during the rotations of mobile device 100. Also shown is the mechanical resting position labeled as "Reference." During the change in orientation, gravity-induced position offset 102 is introduced as shown in plot 101. When the closed-loop controller is subsequently turned-off, a perceivable "click" results due to a gravity-induced position offset.

As shown in plot 103, during the change in orientation, the gravity-induced position offset is tracked by the haptic module. As described in further detail below, a position command signal generated by the closed-loop controller is compensated to compensate for the gravity-induced position offset, resulting in a smooth and controlled movement of the mass to its mechanical resting position without a perceivable "click."

Example System

Figure 2A:
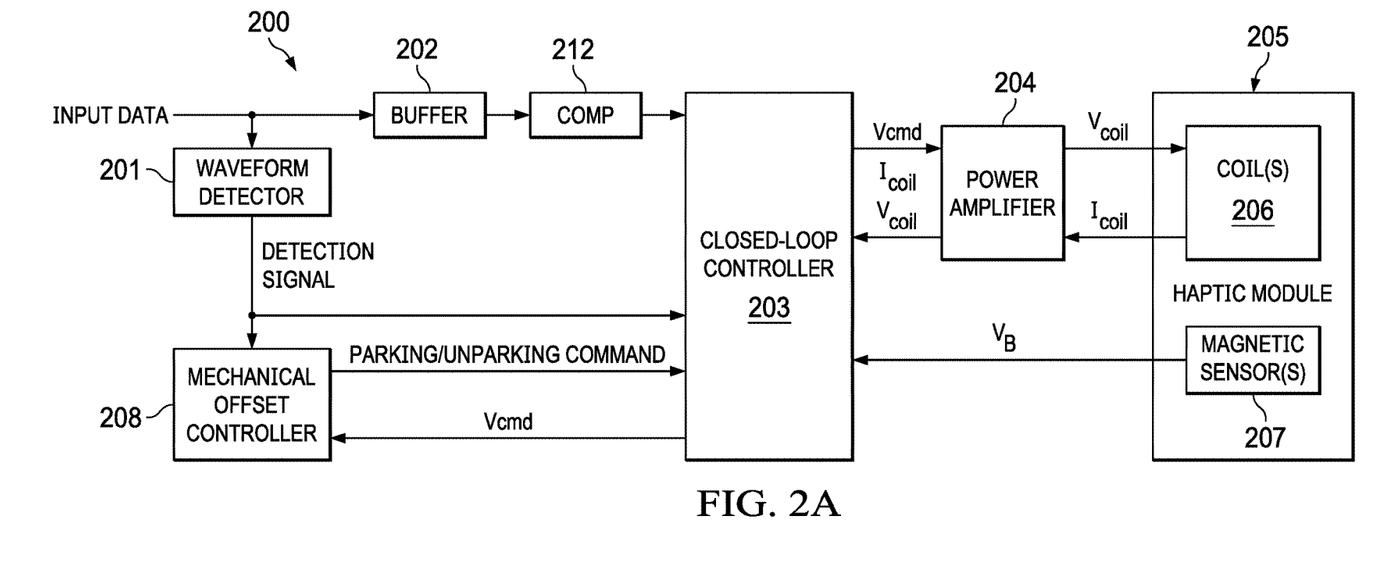
FIG. 2A is a conceptual block diagram of a closed-loop haptic module control system, according to an embodiment.

FIG. 2A is a block diagram of a closed-loop haptic module control system 200, according to an embodiment. System 200 includes waveform detector 201, buffer 202, closed-loop controller 203, power amplifier 204, haptic module 205, mechanical offset controller 208 and soft-clipping gain compressor 212. Haptic module 205 further includes coil(s) 206 and position sensors 207.

System 200 moves a mass of haptic module 205 to its mechanical resting position (hereafter referred to as "unparking"), which is unknown ahead of time, and also returns the mass to its mechanical resting position (hereafter referred to as "parking"). System 200 ensures that the DC bias voltage applied to coil(s) 206 is 0 V before turning off power amplifier 204 that is used to drive current into coil(s) 206. Closed-loop controller 203 and mechanical offset controller 208 work together to maintain position control of the mass while unparking/parking to prevent "ringing" and "phantom clicks."

During operation, waveform detector 201 and buffer 202 (e.g., a look-ahead buffer) receive input data. The input data can be generated, for example, by an application processor or any other device. In general, the waveform detector 201 analyzes the input data to determine if haptics are intended by the application processor or other device. In an embodiment, the input data includes digital values (e.g., "1s" and "0s"), and waveform detector 201 samples the input data to detect the presence of a "1" or "0." The detection of a first non-zero value in the input data indicates the presence of a waveform command in the input data, and a waveform detection signal is generated to start the unparking process to move the mass from its mechanical resting position to its sensor reference position. If N consecutive zero samples are detected within a sample period (e.g., 1 millisecond) indicating the absence of a waveform command in the input data, the detection signal is generated to start the parking process to move the mass from its sensor reference position back to its mechanical resting position. In other embodiments, a threshold or moving-average filter can be used to determine if haptics are intended by the application processor or other device.

In an embodiment, closed-loop controller 203 is activated by the detection signal. Closed-loop controller 203 includes a magnetic model that provides a coarse estimate of the mass position $X_{b\_est}$ based on the coil current $I_{coil}$ and position sensor voltage $V_B$ (e.g., Hall sensor voltage). Closed-loop controller 203 also includes a state-space observer that receives as input $X_{b\_est}$ and outputs a more reliable, higher quality mass position $X_{est}$ and mass velocity $V_{est}$. In an embodiment, the state-space observer is a Kalman filter, which takes as measurements or observations the course estimate of mass position $X_{b\_est}$ and coil current $I_{coil}$. Closed-loop controller 203 also receives a set-point or reference mass position and velocity, and outputs an actuator command voltage ($V_{cmd}$) to power amplifier 204.

Closed-loop controller 203 can implement any desired control law. In an embodiment, controller 203 includes a feedforward component for rapid response and feedback component to compensate for errors in the plant model. An example suitable controller 203 is a proportional-integral-derivative (PID) controller that continuously calculates an error value as the difference between the desired set-point and the measured process variables ($X_{est}$, $V_{est}$), as shown in FIG. 3B.

In an embodiment, $V_{cmd}$ can be a digital command output in pulse code modulation (PCM), pulse width modulation (PWM) or pulse density modulation (PDM). $V_{cmd}$ is used to control the duty-cycle of power amplifier 204. By changing $V_{cmd}$, power amplifier 204 can control how much current is injected into coil(s) 206 and therefore control the movement of the mass in haptic module 205.

Figure 2B:
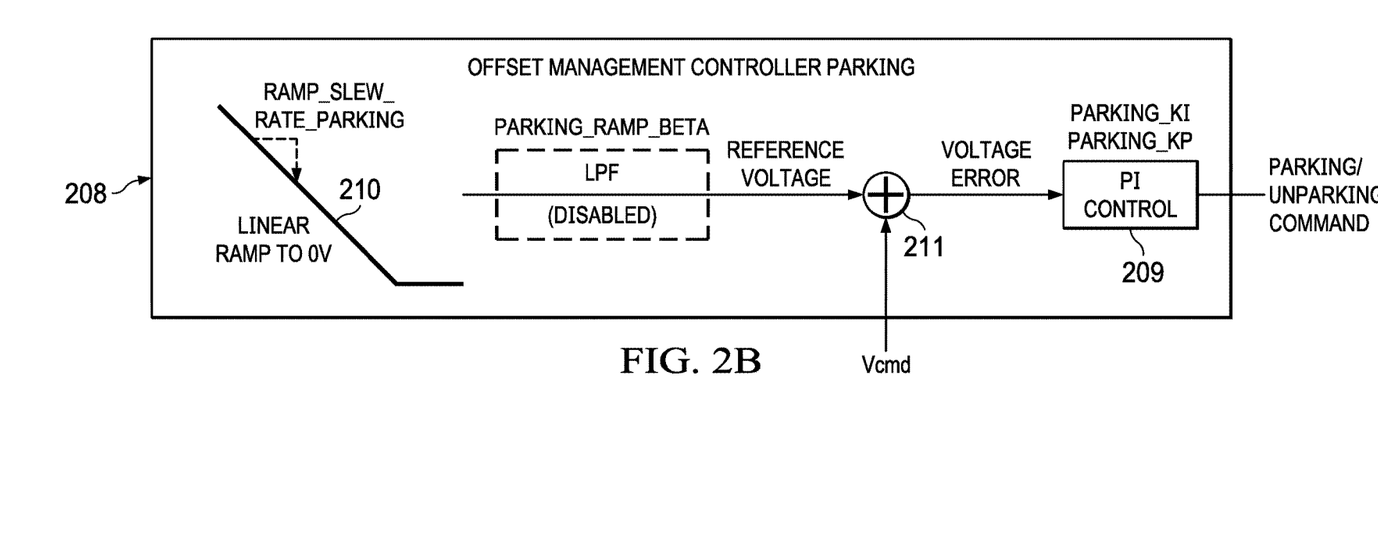
FIG. 2B is a conceptual block diagram of a mechanical offset controller, according to an embodiment.

FIG. 2B is a conceptual block diagram of mechanical offset controller 208 shown in FIG. 2A, according to an embodiment. Mechanical offset controller 208 receives the detection signal from waveform detector 201. In response to the detection signal, mechanical offset controller 208 provides a park command to closed-loop controller 203. In an embodiment, a state machine in closed-loop controller 203 transitions to a parking state in response to the park command, and waits for the moving mass to become motionless, as defined, for example, by a bit in the state-space observer in controller 203. While closed-loop controller 203 is waiting for this condition to be met the waveform command and the park command (described below) are fixed to zero. Once the state-space observer indicates that the mass is motionless, closed-loop controller 203 begins moving the mass towards the mechanical resting position.

The park command generated by mechanical offset controller 208 guides the output voltage of power amplifier 204 with the actuator command voltage $V_{cmd}$. Mechanical offset Controller 208 also uses $V_{cmd}$ as feedback to PI controller 209 to compute a voltage error ($V_{error}$) using adder 211. The voltage error is then used to generate the park command (Ramp[N]) according to Equations [1] and [2]:

$$V_{error}[N]=V_{cmd}[N-1]-V_{ref}[N], \qquad [1]$$

$$\mathrm{Ramp}[N]=\mathrm{Ramp}[N-1]+K_p*V_{error}[N-1]+(K_iK_p)*V_{error}[N], \qquad [2]$$

where $K_i$ and $K_p$ are the PI coefficients used in PI controller 209 and can be stored in registers in mechanical offset controller 208. In an embodiment, the reference voltage 210 ($V_{ref}[N]$) is a ramp having a slope determined by a slew rate stored in a register in mechanical offset controller 208.

In an embodiment, closed-loop controller 203 determines that the mass has reached its mechanical resting position and parking is complete if two parking complete conditions are met. The first parking complete condition is that the actuator command voltage $V_{cmd}$ is settled to within a threshold value. The second parking complete condition is that the mass has come to rest or "motionless" as indicated by, for example, a bit in the state-space observer. If both parking complete conditions are met, parking is completed, the state machine of closed-loop controller 203 transitions to a parking exit state and the actuator command voltage output $V_{cmd}$ is muted. In an embodiment, during the first few moments of parking, the parking complete condition is not evaluated for a specified period of time to prevent an accidental parking completion associated with static friction at the beginning of parking.

Figure 3A:
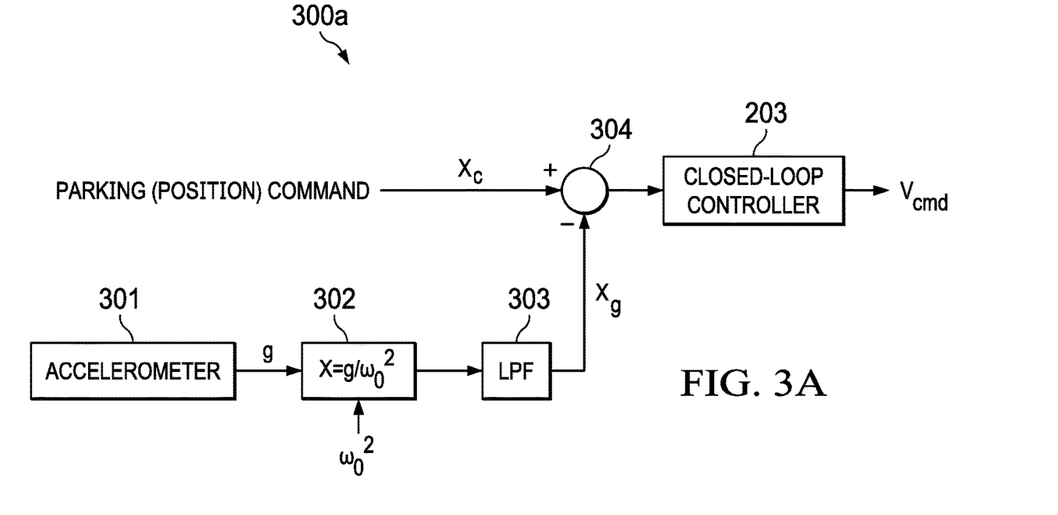
FIG. 3A is a conceptual block diagram of system for gravity-induced position offset tracking using accelerometer-based compensation, according to an embodiment.
Figure 3B:
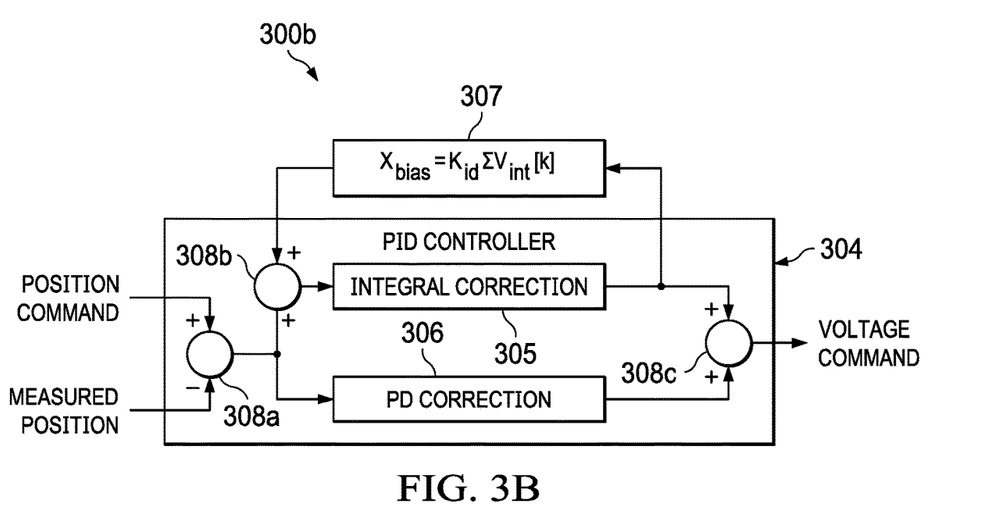
FIG. 3B is a conceptual block diagram of system for gravity-induced position offset tracking using a PID controller, according to an embodiment.

FIG. 3A is a conceptual block diagram of system 300a for gravity-induced position offset tracking using accelerometer-based compensation, according to an embodiment. System 300a includes accelerometer 301, gyroscope 302, gravity-induced position module 303, low-pass filter 304 and adder 305.

Acceleration data from accelerometer 301 is input to gravity-induced position module 303, which computes a gravity-induced position offset, $X_g$, using known motion equations for simple harmonic motion of a mass on a spring when it is subject to a linear elastic restoring force given by Hooke's Law as shown in Equation [3]:

$$X_g = \frac{g}{\omega_0^2}, \quad [3]$$

where g is the gravitational acceleration and $\omega_0$ is angular frequency of the mass.

The gravity-induced position offset $X_g$ is input into a low-pass filter to pass a low-frequency gravity-induced position offset, which is subtracted from the parking (position) command $X_c$ before it is input to closed-loop controller 203. By compensating the parking (position) command, the closed-loop controller 203 can smoothly move the mass from its sensor reference position (e.g., zero reference position) to its mechanical resting position without a perceivable haptic "click."

FIG. 3B is a conceptual block diagram of system 300b for gravity-induced position offset tracking using a proportional-integral-derivative (PID) controller, according to an embodiment. System 300b includes PID controller 304 that further includes integral correction module 305, proportional-derivative (PD) correction module 306, adders 308a-308c and gravity-induced position offset estimator 307. System 300b can be included in closed-loop controller 203 shown in FIG. 2A.

In this embodiment, a measured position (e.g., measured by a position sensor (e.g., a Hall sensor) in the haptic module) is subtracted from the parking/position command by adder 308a, and the resulting position error signal output by adder 308a is summed by adder 308b with bias output voltage $X_{bias}$ output by gravity-induced position offset estimator 307. The position error signal is also input into PD correction module 306.

An integral correction feedback loop inside PID controller 304 includes gravity-induced position offset estimator 307 which represents the instantaneous position of the moving mass in the haptic module. In an embodiment, $X_{bias}$ is given by Equations [4] or [5]:

$$X_{bias} = K_{id} \Sigma V_{int}[k] \quad [4]$$

$$X_{bias} = K_{id} \Sigma V_{int}[k] K_{dd}(V_{int}[k] - V_{int}[k-1])/T_s + K_{pd} V_{int}[k] \quad [5]$$

where $K_{id}$, $K_{dd}$, $K_{pd}$ are integral, derivative and proportional tuning constants, $V_{int}$ is the integrator voltage and Ts is the loop rate of the controller, where Ts=1/Fs and Fs is the closed-loop sampling frequency.

In an embodiment, the tuning constants (Kid, Kdd, Kpd) are determined empirically and are generally dependent on the behavior of the position sensor, the haptic module, control signal delays and the process itself.

Gravity-induced position offset estimator 307 receives as input the integrator voltage $V_{int}$ which acts as a proxy for gravity-induced position offset. Outputs of integral correction module 305 and PD correction module 306 are summed together by adder 308c to generate the actuator command voltage $V_{cmd}$, described in reference to FIGS. 2A and 2B. Integral correction module 305 reduces the effect of the residual error output from adder 308b by exerting a control influence due to the historic cumulative value of the residual error. PD correction module 306 reduces the effect of the position error output from adder 308a by exerting a control influence generated by the rate of error change.

Example Process

Figure 4:
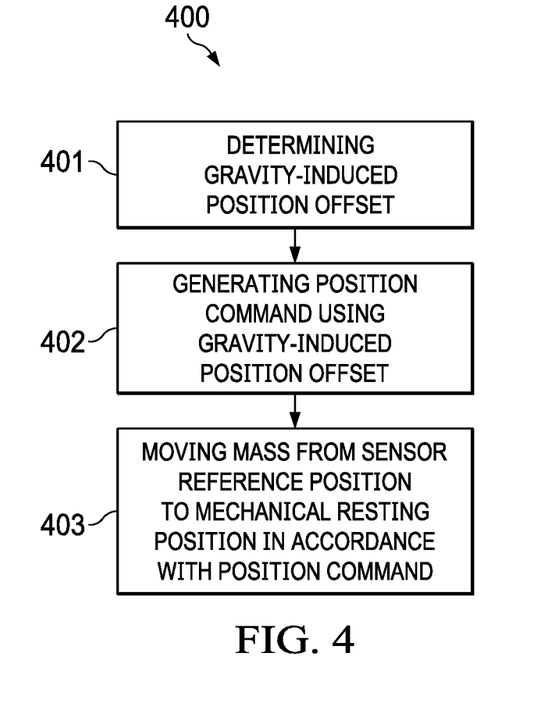
FIG. 4 is a flow diagram of a process for gravity-induced position offset tracking, according to an embodiment.

FIG. 4 is a flow diagram of a process for gravity-induced position tracking, according to an embodiment. Process 400 can be implemented by, for example, the mobile architecture 500 described in reference to FIG. 5.

Process 400 begins by determining, by a processor, a gravity-induced position offset of a mass in a haptic module (401), as described in reference to FIGS. 3A and 3B.

Process 400 continues by generating, by the processor, a position command for moving the mass from a sensor reference position to a mechanical resting position based at least in part on the gravity-induced position offset (402).

Process 400 continues by moving, by a closed-loop controller, the mass from the sensor reference position to the mechanical resting position in accordance with the position command (403).

Example Device Architecture

Figure 5:
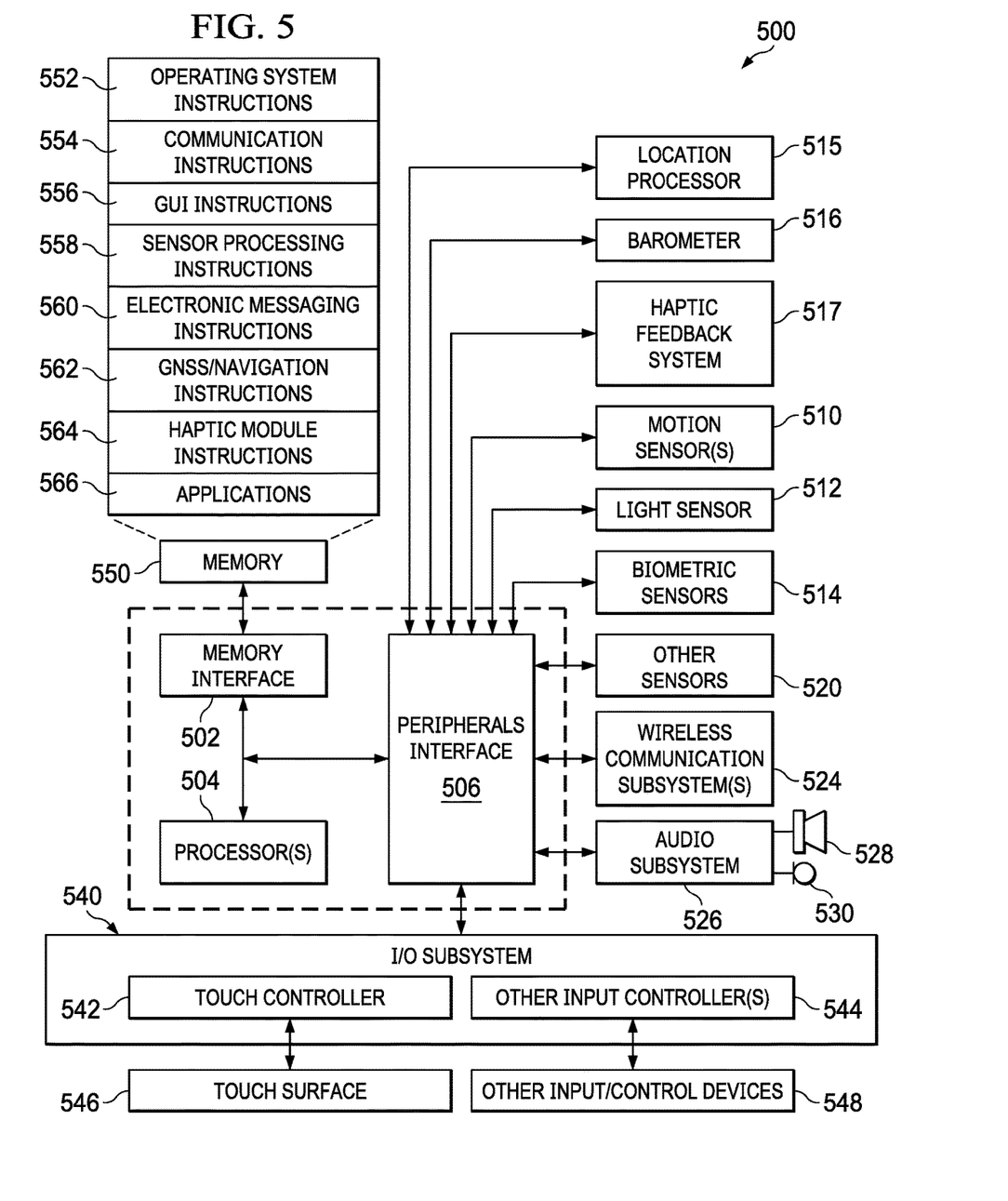
FIG. 5 is a diagram of an example mobile device architecture that uses a haptic module as described in reference to FIGS. 1-4, according to an embodiment.

FIG. 5 is a diagram of an example mobile device architecture that uses one of the haptic modules described in reference to FIGS. 1-4, according to an embodiment.

Architecture 500 may be implemented in any mobile device for generating the features and processes described in reference to FIGS. 1-4, including but not limited to smart phones and wearable computers (e.g., smart watches, fitness bands). Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor(s) 510, light sensor 512, and proximity sensor 514 may be coupled to peripherals interface 506 to facilitate orientation, lighting, and proximity functions of the device. For example, in some embodiments, light sensor 512 may be utilized to facilitate adjusting the brightness of touch surface 546. In some embodiments, motion sensor(s) 510 (e.g., an accelerometer, rate gyroscope) may be utilized to detect movement and orientation of the device. Accordingly, display objects or media may be presented according to a detected orientation (e.g., portrait or landscape).

Haptic module 517, under the control of haptic module instructions 572, provides the features and performs the processes described in reference to FIGS. 1-4, such as, for example, implementing haptic feedback (e.g., vibration) and parking. Haptic module 517 can include one or more actuators, such as piezoelectric transducers, electromechanical devices, and/or other vibration inducing devices that are mechanically connected to an input surface (e.g., touch surface 546). Drive electronics coupled to the one or more actuators cause the actuators to induce a vibratory response into the input surface, providing a tactile sensation to a user touching or holding the device.

Other sensors may also be connected to peripherals interface 506, such as a temperature sensor, a barometer, a biometric sensor, or other sensing device, to facilitate related functionalities. For example, a biometric sensor can detect fingerprints and monitor heart rate and other fitness parameters.

Location processor 515 (e.g., GNSS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used to support an electronic compass application.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 526 may be coupled to a speaker 528 and one or more microphones 530 to facilitate voice-enabled functions, such as voice recognition, voice replication, digital recording, and telephony functions. In an embodiment, audio subsystem includes a digital signal processor (DSP) that performs audio processing, such as implementing codecs.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 545. In one embodiment, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some embodiments, device 500 may present recorded audio and/or video files, such as MP3, AAC, and MPEG video files. In some embodiments, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, iOS, WINDOWS, or an embedded operating system such as VxWorks. Operating system 552 may include instructions for handling basic system services and for performing hardware dependent tasks. In some embodiments, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS (e.g., GPS, GLOSSNAS) and navigation-related processes and functions; camera instructions 570 to facilitate camera-related processes and functions; and haptic module instructions 572 for commanding or controlling haptic module 517 and to provide the features and performing the processes described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C# and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by a processor, a gravity-induced position offset of a mass in a haptic module;
   generating, by the processor, a position command for moving the mass from a sensor reference position to a mechanical resting position based at least in part on the gravity-induced position offset; and
   moving, by a closed-loop controller, the mass from the sensor reference position to the mechanical resting position in accordance with the position command.

2. The method of claim 1, wherein determining the gravity-induced position offset comprises:
   determining a gravitational acceleration of the mass;
   determining an angular frequency of the mass;
   determining the gravity-induced position offset based on the gravitational acceleration and the angular frequency; and
   filtering, by a low-pass filter, the gravity-induced position offset.

3. The method of claim 2, wherein the gravity-induced position offset is given by:

$$X_g = \frac{g}{\omega_o^2},$$

where g is the gravitational acceleration of the mass and $\omega_0$ is the angular frequency.

4. The method of claim 1, wherein determining the gravity-induced position offset comprises:
   determining a position error from a measured position of the mass and the position command;
   estimating the gravity-induced position offset using accumulated integrator voltage output by an integral correction loop of a proportional-integral-derivative (PID) controller;
   adding the estimated gravity-induced position offset to the position error;
   providing as input the added estimated gravity-induced position offset and position error into an integral correction module;
   providing as input the position error into a proportional-derivative (PD) correction module in the PID; and
   adding outputs of the integral correction module and PD correction module to provide a voltage command for moving the mass in the haptic module.

5. A linear resonant actuator (LRA) comprising:
   a housing;
   a mass disposed in the housing and configured to oscillate in response to a haptic waveform;
   a motion sensor configured to sense an acceleration of the mass due to gravity;
   a processor configured to:
      determine a gravity-induced position offset of the mass based on the gravitational acceleration and an angular frequency of the mass due to the oscillating; and
      determine a position command using the gravity-induced position offset; and
   a closed-loop controller configured to:
      move the mass from a sensor reference position in the housing to a mechanical resting position in the housing in accordance with the position command.

6. The LRA of claim 5, wherein determining the gravity-induced position offset comprises:
   determining a gravitational acceleration of the mass;
   determining an angular frequency of the mass;
   determining the gravity-induced position offset based on the gravitational acceleration and the angular frequency; and
   filtering, by a low-pass filter, the gravity-induced position offset.

7. The LRA of claim 6, wherein the gravity-induced position offset is given by:

$$X_g = \frac{g}{\omega_o^2},$$

where g is the gravitational accelerations and $\omega_0$ is the angular frequency of the mass.

8. The LRA of claim 5, wherein determining the gravity-induced position offset comprises:
   determining a position error from a measured position of the mass and the position command;
   estimating the gravity-induced position offset using accumulated integrator voltage output by an integral correction loop of a proportional-integral-derivative (PID) controller;
   adding the estimated gravity-induced position offset to the position error;
   inputting the added estimated gravity-induced position offset and position error into an integral correction module;
   inputting the position error into a proportional-derivative (PD) correction module in the PID; and
   adding outputs of the integral correction module and PD correction module to provide a voltage command for moving the mass in the housing.

9. An electronic device comprising:
   an input surface;
   a haptic module mechanically coupled to the input surface and including a mass that moves in response to a haptic waveform;
   one or more processors configured to:
      determine a gravity-induced position offset of the mass in the haptic module; and
      generate a position command module using the gravity-induced position offset, the position command for moving the mass from a sensor reference position in the haptic module to a mechanical resting position in the haptic module; and a closed-loop controller configured to:
- move the mass from the sensor reference position to the mechanical resting position in accordance with the position command; and
- oscillate the mass in accordance with the haptic waveform.

10. The electronic device of claim 9, wherein determining the gravity-induced position offset comprises:
   - determining a gravitational acceleration of the mass;
   - determining an angular frequency of the mass;
   - determining the gravity-induced position offset of the mass based on the gravitational acceleration and the angular frequency; and
   - filtering, by a low-pass filter, the gravity-induced position offset.

11. The electronic device of claim 10, wherein the gravity-induced position offset is given by:

$$X_g = \frac{g}{\omega_o^2},$$

where g is the gravitational acceleration and $\omega_0$ is the angular frequency of the mass.

12. The electronic device of claim 9, wherein determining the gravity-induced position offset comprises:
   - determining a position error from a measured position of the mass and the position command;
   - estimating the gravity-induced position offset using accumulated integrator voltage output by an integral correction loop of a proportional-integral-derivative (PID) controller;
   - adding the estimated gravity-induced position offset to the position error;
   - inputting the added estimated gravity-induced position offset and position error into an integral correction module;
   - inputting the position error into a proportional-derivative (PD) correction module in the PID; and
   - adding outputs of the integral correction module and PD correction module to provide a voltage command for moving the mass in the haptic module.

* * * * *

UNITED STATES PATENT AND TRADEMARK OFFICE
CERTIFICATE OF CORRECTION

PATENT NO. : 10,564,728 B1
APPLICATION NO. : 16/127139
DATED : February 18, 2020
INVENTOR(S) : Hari Vasudevan Page 1 of 1

It is certified that error appears in the above-identified patent and that said Letters Patent is hereby corrected as shown below:

In the Drawings

Sheet 3, figure 3B, delete reference number "304" and insert -- 309 --;

In the Specification

Column 4, Line 63, delete "gyroscope 302,";

Column 4, Line 64, replace "position module 303" with -- position module 302 --;

Column 4, Line 64, replace "low-pass filter 304" with -- low-pass filter 303 --;

Column 4, Line 65, replace "adder 305" with -- adder 304 --;

Column 4, Line 67, replace "position module 303" with -- position module 302 --;

Column 5, Line 24, replace "PID controller 304" with -- PID controller 309 --;

Column 5, Line 39, replace "PID controller 304" with -- PID controller 309 --; and In the Claims Column 10, Line 35, Claim 7, replace "accelerations" with -- acceleration --.

Signed and Sealed this
Eleventh Day of August, 2020

Andrei Iancu
*Director of the United States Patent and Trademark Office*